United States Patent
Tabet

(10) Patent No.: US 7,645,160 B2
(45) Date of Patent: Jan. 12, 2010

(54) TELESCOPING CONNECTOR ASSEMBLY

(75) Inventor: Edouard Tabet, Brossard (CA)

(73) Assignee: Belden CDT (Canada) Inc., Pointe-Claire (CA)

( * ) Notice: Subject to any disclaimer, the term of this patent is extended or adjusted under 35 U.S.C. 154(b) by 0 days.

(21) Appl. No.: 12/188,460

(22) Filed: Aug. 8, 2008

(65) Prior Publication Data

US 2009/0047800 A1    Feb. 19, 2009

Related U.S. Application Data

(60) Provisional application No. 60/954,934, filed on Aug. 9, 2007.

(51) Int. Cl.
*H01R 13/60* (2006.01)
(52) U.S. Cl. .................................................. 439/540.1
(58) Field of Classification Search ............. 439/540.1, 439/532, 557–558
See application file for complete search history.

(56) References Cited

U.S. PATENT DOCUMENTS

| | | | |
|---|---|---|---|
| 4,986,762 A | 1/1991 | Keith | |
| 5,497,444 A | 3/1996 | Wheeler | |
| 5,639,261 A | 6/1997 | Rutkowski et al. | |
| 6,024,610 A | 2/2000 | Schaffer | |
| 6,466,724 B1 | 10/2002 | Glover et al. | |
| 6,608,764 B2 | 8/2003 | Clark et al. | |
| 6,761,594 B2 | 7/2004 | Johnsen et al. | |
| 6,923,679 B1 * | 8/2005 | Wu | 439/573 |
| 7,094,095 B1 | 8/2006 | Caveney | |
| 7,241,182 B2 | 7/2007 | Clark et al. | |
| 7,244,144 B2 | 7/2007 | Follingstad | |
| 2005/0041947 A1 * | 2/2005 | Barker et al. | 385/135 |
| 2007/0249221 A1 * | 10/2007 | Bade et al. | 439/540.1 |

\* cited by examiner

*Primary Examiner*—Neil Abram
*Assistant Examiner*—Phuong Nguyen
(74) *Attorney, Agent, or Firm*—Goudreau Gage Dubuc

(57) ABSTRACT

A telescoping connector assembly comprising a hollow rectangular bezel adapted for mounting in a patch bay panel frame. A plurality of telescoping connectors are mounted in the bezel and are adapted for relative movement thereto between a rearward position and a forward position. For this purpose, each of the telescoping connectors illustratively comprises a subframe having a pair of upper and lower runners adapted to engage complementary pairs of upper and lower slots formed in the bezel. The runners are fabricated from a flexible material, which allows the connectors to be extracted from the bezel by applying a bending force to the runners.

28 Claims, 6 Drawing Sheets

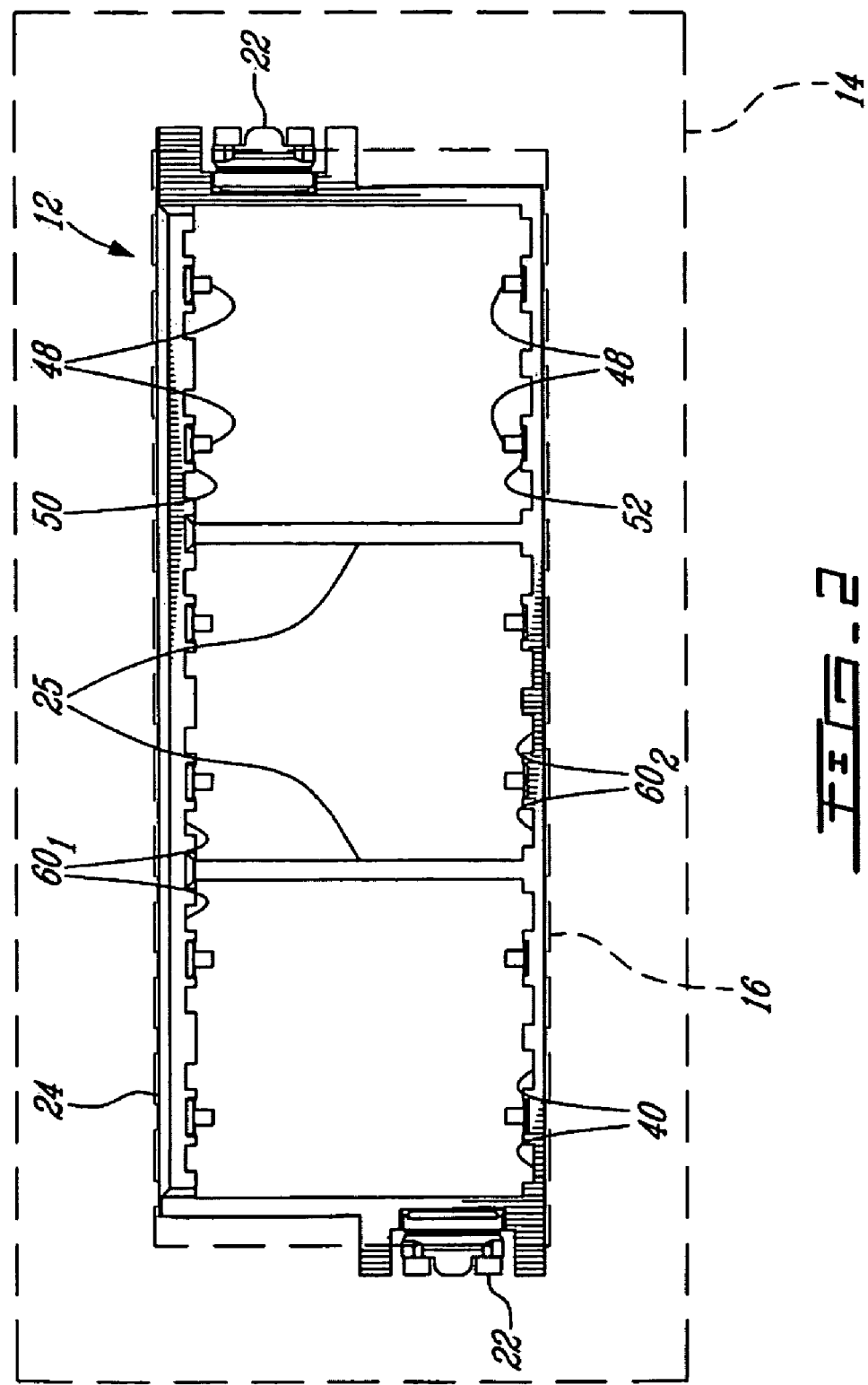

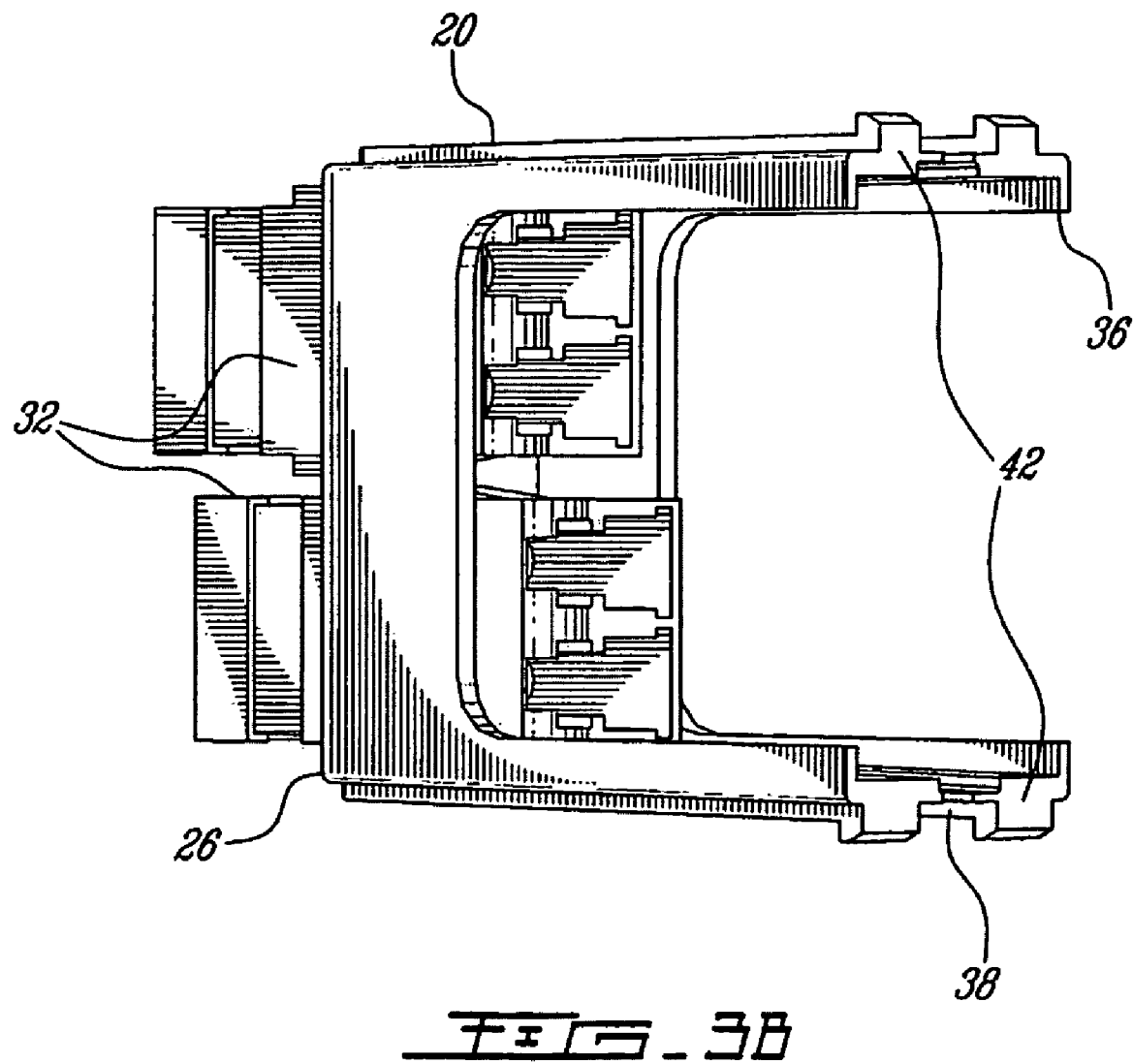
FIG_3B

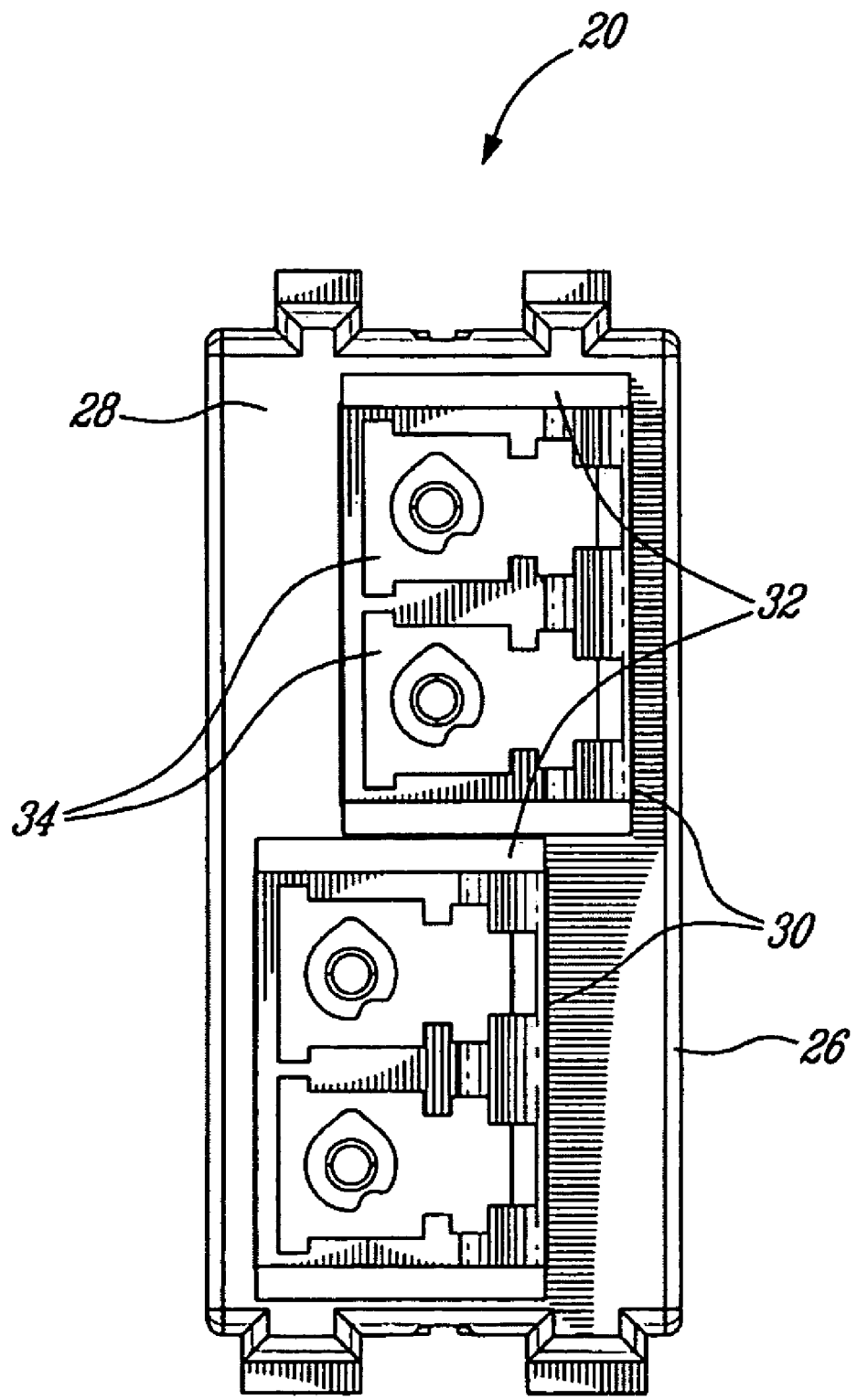
FIG_3C

TELESCOPING CONNECTOR ASSEMBLY

CROSS REFERENCE TO RELATED APPLICATIONS

This application claims priority on U.S. Provisional Application No. 60/954,934, filed on Aug. 9, 2007 and which is herein incorporated by reference in its entirety.

FIELD OF THE INVENTION

The present invention relates to a telescoping connector assembly for use together with a variety of communications technologies such as wireless, light and copper for applications in fiber optics, broadcast, industrial and telecommunications.

BACKGROUND

The prior art discloses a variety of connector assemblies for use with patch bay panels allowing for the interconnection of cables terminated along a rearward face of the patch bay panel with cables received into sockets along the front face of the patch bay panel. Cables are typically terminated by a plug or the like which is inserted into the socket. Such plugs typically comprise a latch assembly which interlocks with the socket thereby reducing the chance that a cable is inadvertently removed from its respective socket. In the event that it is wished to removed a plug from a socket, the latch must first be actuated, typically by depressing an exposed portion of the latch using the fingers or a thumb. In many cases space within the patch bays is limited and as a result the density of cables which must be terminated within a given patch bay is steadily increasing. In order to accommodate the increases in density, the inter-spacing between the connectors of adjacent cables is typically decreased.

With inter-spacing sufficiently small, or when the receptacle is occluded by the sides of the rack or opening within which the connector is disposed, it becomes difficult or impossible to actuate the latches using the fingers or thumb. In order to overcome this problem, the prior art discloses using a sufficiently slim special tool to actuate the latch mechanism. Often, however, such a tool is unavailable. Additionally such tools are typically designed for use with a particular connector/plug type and therefore a multiple of such tools must ordinarily be carried.

Additionally, prior art devices are difficult to access from behind, making the termination of cables or the like on the rearward side of the connectors difficult or impossible.

SUMMARY OF THE INVENTION

More specifically, in order to address the above and other drawbacks, there is provided a telescoping connector assembly for mounting in a mounting opening in a face of a network equipment such as a patch panel, the assembly for interconnecting a first cable comprising a first cable plug with a second cable and comprising at least one connector comprising a first socket on a front face thereof, the socket adapted to receive the first cable plug and an interface at a rear face thereof, the interface adapted to receive the second cable, and a sliding mechanism positioned between the mounting opening and the at least one connector, the mechanism enabling movement of the at least one connector along a path arranged at an angle to the face between a rearward position and a forward position.

There is also provided a telescoping connector assembly for mounting in a mounting opening in a face of a network equipment such as a patch panel and terminating a pair of cables, each of the cables comprising a cable plug. The connector assembly comprises a pair of connectors within the mounting opening, each of the connectors comprising at a front face thereof a socket adapted to receive the cable plug, and a sliding mechanism positioned between the mounting opening and each of the pair of connectors for enabling independent movement of each of the pair of first connectors between a rearward position and a forward position along respective parallel paths arranged at an angle to the front face of the frame.

There is also disclosed a method for removing a cable plug terminating a cable from a socket into which the cable plug has been secured, the cable plug further comprising a release lever for releasing the cable plug from the socket. The method comprises providing a mounting opening in a face of a network equipment, providing a sliding mechanism positioned between the mounting opening and the socket, the sliding mechanism enabling movement of the socket along a predetermined path arranged at an angle to the face between a rearward position and a forward position, sliding the socket from the rearward position to the forward position; and depressing the release lever while simultaneously retracting the cable plug from the socket.

Other objects, advantages and features of the present invention will become more apparent upon reading of the following non-restrictive description of specific embodiments thereof, given by way of example only with reference to the accompanying drawings.

BRIEF DESCRIPTION OF THE FIGURES

FIG. 2 is a front plan view of a bezel of a telescoping connector assembly in accordance with an illustrative embodiment of the present invention;

FIG. 3B is a left rear perspective view of the connector of FIG. 3A;

FIG. 3C is a front plan view of the connector of FIG. 3A; and

DETAILED DESCRIPTION OF THE ILLUSTRATIVE EMBODIMENTS

Figure 1:
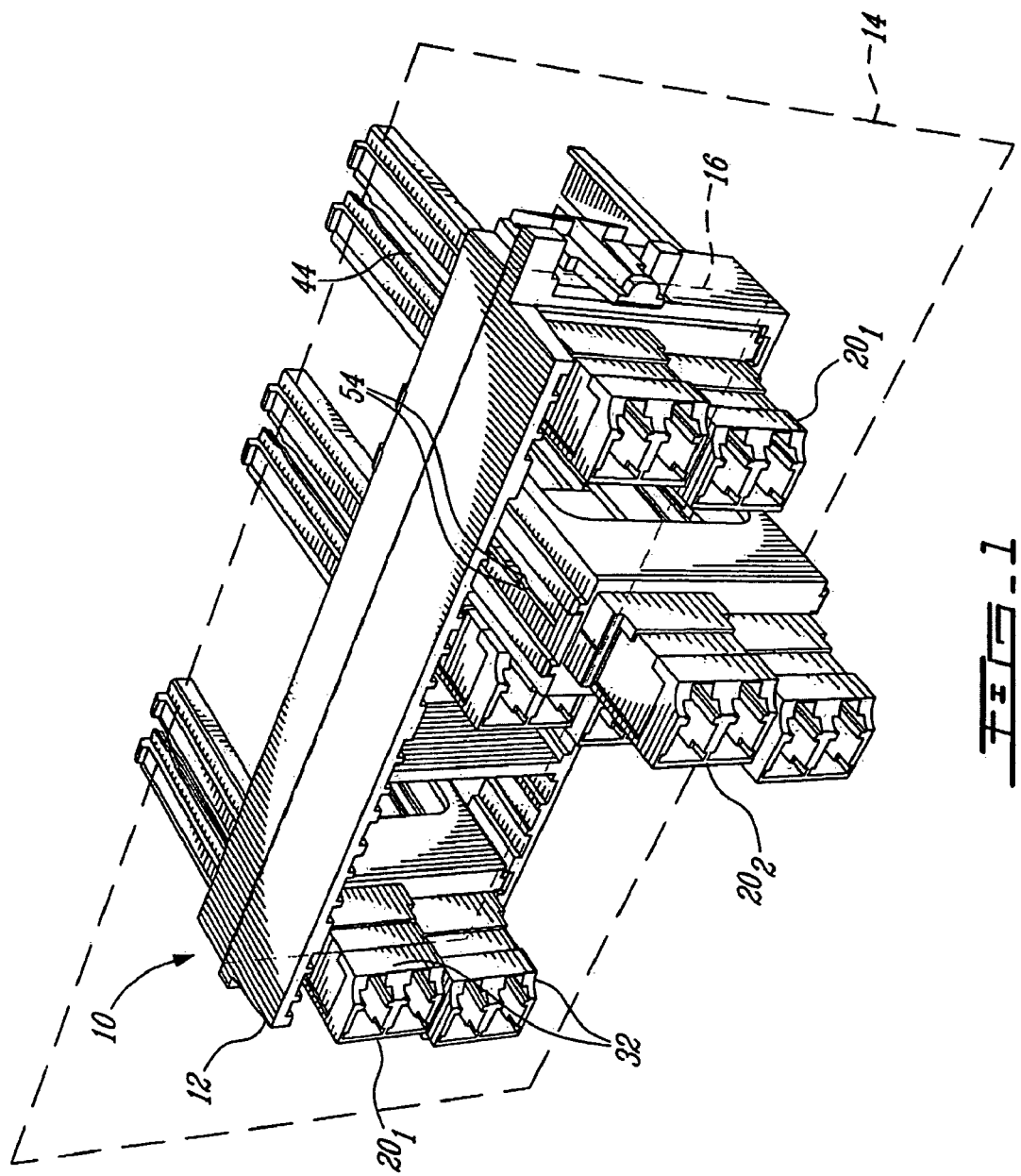
FIG. 1 is a raised right front perspective view of a telescoping connector assembly in accordance with an illustrative embodiment of the present invention.

Referring now to FIG. 1, a telescoping connector assembly, generally referred to using the reference number 10, will now be described. The assembly 10 is comprised of a hollow rectangular bezel 12 adapted for mounting to a network equipment, illustratively a patch bay panel frame 14, for example a patch panel frame adapted to fit within a standard (e.g. 19 inch) network rack (not shown). In this regard, a front face of the network equipment/frame 14 defines a mounting opening 16 adapted for receiving the bezel. A plurality of telescoping connectors as in 20 (illustratively six (6) can fit within the bezel 12 although only four (4) are shown) are mounted within each bezel 12 and adapted for sliding movement relative to the bezel 12 and to one another along a path arranged at an angle (e.g. 90 degrees as illustrated) to a front face of each bezel 12 between a connector in a normal rearward position ($20_1$) and a connector in a forward position ($20_2$).

Note that although the connector assembly 10 is illustratively shown mounted to a patch bay panel frame 14, in a particular embodiment the connector assembly 10 may be used, for example, together with other devices or equipment (not shown).

Referring now to FIG. 2, the bezel 12 comprises on a periphery thereof a locking assembly 22 providing a snap fit interlock with the edge of the patch bay panel frame 14 and securing the bezel 12 within the mounting opening. Additionally, the bezel 12 may optionally include an upper strip 24 on which an identification label or the like may be fastened. In a particular embodiment the bezel 12 may also include one or more supporting members as in 25 positioned within the bezel 12 substantially at right angles to an upper and a lower inner surface thereof (not shown) to provide for a more rigid construction. In a standard sized 19" rack typically four (4) bezels as in 12 will be used in each row of the patch bay panel.

Figure 3A:
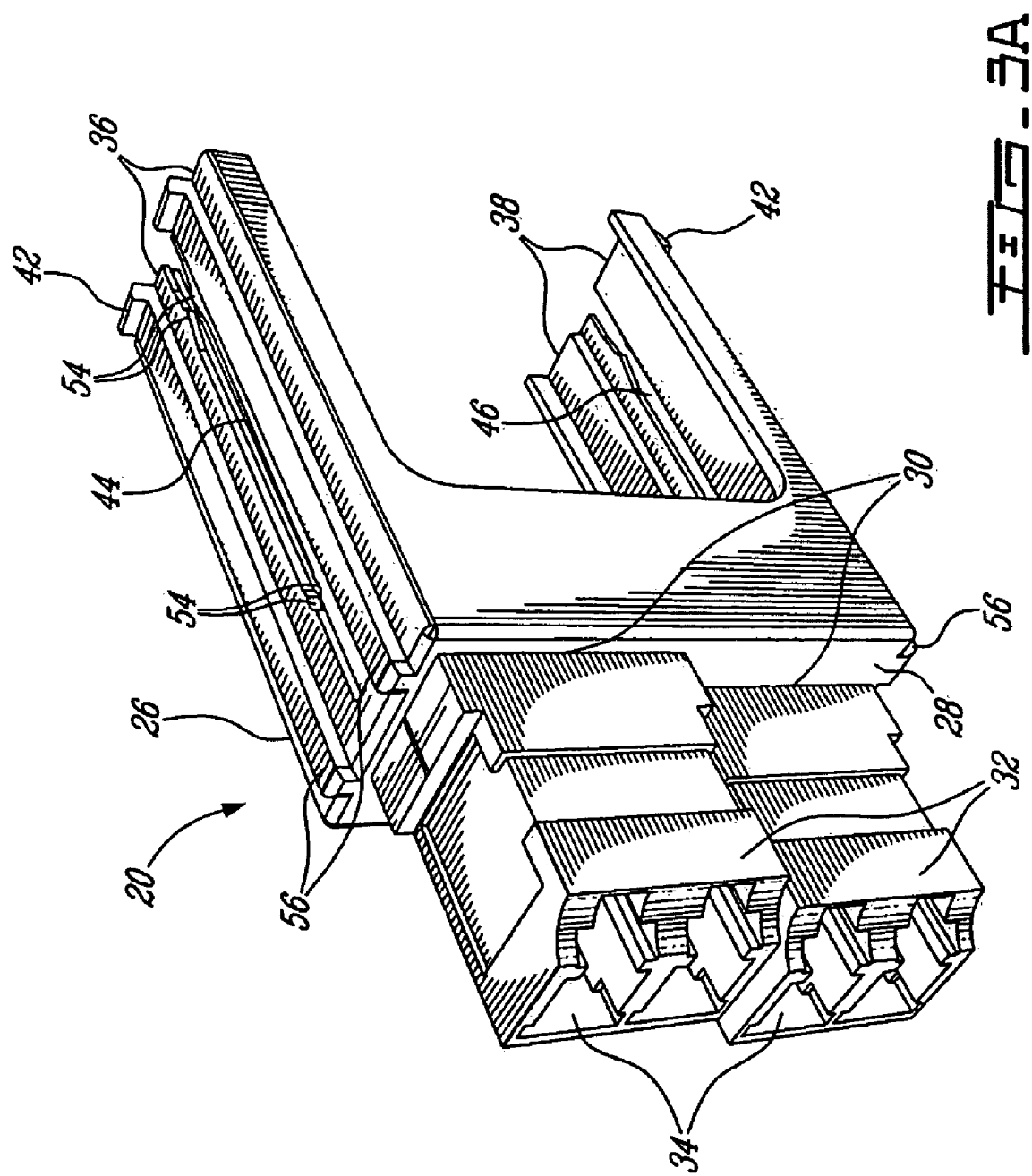
FIG. 3A is a raised right front perspective view of a telescoping connector in accordance with an illustrative embodiment of the present invention.

Referring now to FIGS. 3A, 3B and 3C, each of the telescoping connectors as in 20 comprises a subframe 26 including a planar front surface 28 defining at least one aperture as in 30 and adapted for receiving a back-to-back receptacle 32. Each back-to-back receptacle 32 illustratively comprises a pair of plug receiving sockets as in 34 on a forward face thereof and a second pair of plug receiving sockets (not shown), one of which is in back-to-back configuration with a respective one of the front sockets as in 34. Illustratively, both sockets in back-to-back configuration are adapted to receive a connector plug terminating a cable (not shown), thereby provisioning the interconnection of cables terminated along a rearward face of the patch bay panel with cables received into sockets along the front face of the patch bay panel.

Still referring to FIGS. 3A, 3B and 3G, illustratively two (2) LC type duplex modular back-to-back receptacles as in 32 for interconnecting fiber optic cables are provided for each telescoping connector 20. The pair of modular receptacles as in 32 are illustratively staggered within the subframe 26 in order to reduce their combined length (as overlap of the locking tabs, not shown, used to secure each receptacle as in 32 within their respective apertures as in 30 is avoided). In a particular embodiment the connection modules could otherwise be arranged in rows and include different receptacles supporting different technologies, in particular those related to fiber optics, such as LC, ST, SC, FC, MTJR, or MPOtype receptacles and the like. Additionally, with appropriate modifications each connector 20 could also be adapted to receive multiple connectors of different copper technologies such as RJ-45, MDVO, Keystone, IDC compatible connectors or the like. Of note is that space which remains free on the front surface 28 can also be used for adhering labels or the like (not shown) for identification purposes. Alternatively, or additionally, the connectors as in 20 and/or the back-to-back receptacles as in 32 may be color coded to indicate a particular type of technology or for other identification purposes. Additionally of note is that, although the receptacles as in 32 are shown as being modular and adapted for insertion into their respective apertures as in 30, in a particular embodiment the receptacles as in 32 and/or their respective sockets 34 could be molded or otherwise formed directly in the subframe 22.

Referring back to FIG. 2 in addition to FIGS. 3A, 3B and 3C, each connectors as in 20 is comprised of a pair of generally parallel and opposed runners or running surfaces, such as an upper runner 36 and a lower runner 38. The upper runner 36 and the lower runner 38 are illustratively manufactured from a flexible and non-conductive material such as plastic and engage complementary pairs of upper and lower elongate slots as in 40 formed in the bezel 12. In order to prevent the connectors as in 20 from being easily removed from the bezel 12, each of the runners as in 36, 38 is provided with a raised lip 42 which engages a rearward edge of the bezel 12 when a connector as in 20 is in the forward position. Provision of a flexible material used in fabrication of the pairs of runners 36, 38 allows the connectors as in 20 to be extracted by the bezel 12 by applying a bending force to the pairs of runners 36, 38 (for example by gripping the pairs of runners 36, 38 between opposed finger and thumb and applying a suitable gripping force) such that the raised lips 42 clear the rearward edge of the bezel 12.

One advantage of providing for removal of the connectors as in 20 is that the connectors as in 20 can be replaced with others, for example having a different technology (as will be discussed in more detail below). Another advantage of providing for removal of the connectors as in 20 is that the reverse side of the connector 20 can be more readily accessed thereby allowing, for example, cables (not shown) to be easily attached to the rearward side of the connector 20 or easily removed for cleaning, or repair or the like. In this regard, typically during installation of fiber optic cables the ends of the cables must be cleaned of dust and the like to ensure good transmission of light signals via the connector 20. This is typically carried out using a small rotary brush or the like (not shown). Provision of access to the rearward side of the connector 20 can improve the quality of the cleaning which can be carried out and therefore the resultant connection. Additionally, provision of removable connectors as in 20 allows a patch bay frame (not shown) to be preinstalled with a plurality of bezels 12 which can subsequently, for example following installation of the frame in a network rack or the like (also not shown), be stocked with suitable telescoping connectors as in 20 (for example, and as will be discussed in more detail below, of different communication technologies or the like) in the field.

Still referring to FIG. 2 in addition to FIGS. 3A, 3B and 3C, an open ended, upper slot 44 is defined by the upper runner 36 and a similar open ended lower slot 46 is defined by the lower runner 38. A corresponding series of bosses as in 48 are provided along the upper inner surface 50 and lower inner surface 52 of the bezel 12. When a connector 20 is mounted within the bezel 12 at a particular position, a corresponding boss 48 is positioned within a respective one of the slots 44, 46. Pairs of opposed teeth as in 54 are provided projecting into the slots 44, 46 at various positions along the inside of the runners 36, 38 which engage the boss 48 when the connector 20 is moved between the forward position and the rearward position within the bezel 12. The teeth as in 54 provide both tactile feedback as to whether the connector is in a given position as well as providing some protection against inadvertent movement of the connector 20 within the bezel 12 (for example when a cable, not shown, is tugged oh or the like). In particular embodiment, a series of opposing teeth as in 54 are provided such that the connector 20 may be positioned at a plurality of positions relative to the bezel 12, similar in action to a ratchet mechanism or the like. One advantage of this configuration when in use together with copper wire technologies (such as the ubiquitous twisted pair conductors, not shown) is that the positioning of the connectors relative to one another can be adjusted in order to potentially reduce cross talk.

Still referring to FIG. 2 in addition to FIGS. 3A, 3B and 3G, in order to ensure correct orientation or polarization of the connectors as in 20 within the bezel, ridges as in 56 are provided along the outer edges 58 of the runners 36, 38. The ridges as in 56 are adapted to be engaged by corresponding channels as in 60 molded or otherwise formed across the upper and lower inner surfaces 50, 52 of the bezel 12. Illustratively the ridges as in $60_1$ along the upper runners 36 are of different width than the ridges as in $60_2$ along the lower runners 38 (as are the widths of their corresponding slots as in 60). As a result, if the connector 20 is inadvertently reversed it will be unable to be correctly installed within the bezel 12. Additionally, the ridges 56 are illustratively of slightly increasing width along their length from front to back which provides additional tactile clues as to the position of the connector 20 within the bezel 12 as well as providing for increased pressure on the rearmost opposed teeth as in 54.

Figure 4:
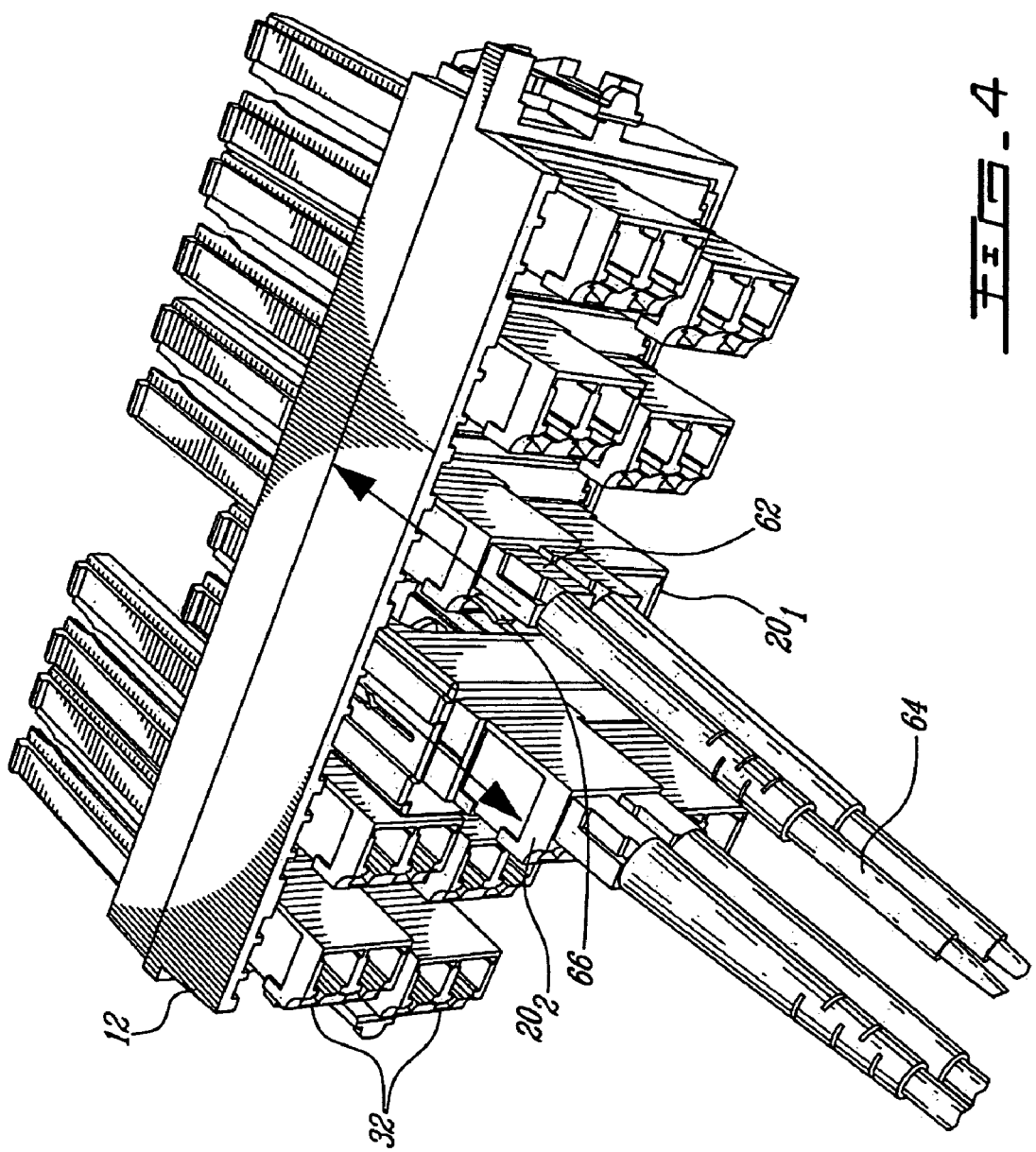
FIG. 4 is a raised left front perspective view of the telescoping connector assembly of FIG. 1 with a cable installed.

Referring now to FIG. 4, in operation a cable plug 62 terminating a cable 64 is inserted into a respective one of the receptacles as in 32 and secured therein via a latch mechanism 66 which is engaged by a latch engaging structure (not shown) on the receptacle 32. As will now be apparent to a person of skill in the art, given the high density of receptacles as in 32, the individual receptacles as in 32 are difficult to access. In order to simplify access to a particular receptacle as in 32, the telescoping connector 20 is slid forward in the bezel 12 until in the forward position as indicated. As will now be apparent to a person of ordinary skill in the art, when a given telescoping connector 20 is placed individually in a forward position, the latch mechanism 66 of a given cable plug 62 is rendered more easily accessible. Additionally, the interconnection between the receptacle 30 and the subframe 22 could be modified such that a degree of play is introduced between the receptacle 30 and the subframe 22, thereby allowing the receptacle 30 to pivot (or bend) slightly relative to the subframe 22.

Still referring to FIG. 4, typically, the runners as in 36, 38 are of the same length sufficient to provide adequate access to the latch mechanisms as in 66, illustratively about 25 mm. In a particular embodiment, however, the runners as in 36, 38 of different telescoping connectors 20 could be of different lengths, allowing, for example, the positioning of the telescoping connectors 20 to be staggered when all in the forward position.

Referring back to FIG. 1 in addition to FIG. 4, although the fronts of the receptacles 32 are shown as projecting slightly in front of the frame 14 when in the connector is in the normal rearward position ($20_1$), in a particular embodiment the bezel 12 and connectors as in 20 could be adapted such that the fronts of the receptacles 32 are flush with the surface of the frame 14 or retracted when the connector(s) are positioned in the normal rearward position ($20_1$). As such, the assembly of the present invention is not only suitable for high density applications but also for recessed applications where the latch mechanisms 66 of the cable plugs 62 are not easily accessible. In this regard, the connector can be between the normal rearward position ($20_1$) and the forward position ($20_2$) simply by pulling on the cable 64.

Although the present invention has been described above by way of specific embodiments thereof, it can be modified without departing from the spirit and nature of the subject invention as defined by the appended claims.

I claim:

1. A telescoping connector assembly for mounting in a mounting opening in a face of a network equipment, the assembly for interconnecting a first cable comprising a first cable plug with a second cable and comprising:

at least one connector comprising a first socket on a front face thereof, said socket adapted to receive the first cable plug and an interface at a rear face thereof, said interface adapted to receive the second cable;

a sliding mechanism positioned between the mounting opening and said at least one connector, said sliding mechanism enabling movement of said at least one connector along a path arranged at an angle to the face between a retracted position and a telescoped position while maintaining an interconnection between the first cable plug and the second cable plug; and a retaining mechanism for impeding movement of said at least one connector beyond said telescoped position.

2. The telescoping connector assembly of claim 1, wherein the network equipment is a patch panel.

3. The telescoping connector assembly of claim 1, wherein said angle is a right angle.

4. The telescoping connector assembly of claim 1, wherein the patch panel has a longitudinal width sized to fit within the network rack.

5. The telescoping connector assembly of claim 1, wherein said angle is 90 degrees, and further wherein each of said pair of runners extends substantially at right angles to said front face.

6. The telescoping connector assembly of claim 1, wherein said connector conforms to a standardized a copper technology selected from the group consisting of Registered Jack 45 (RJ-45), Modular Data Voice Outlet (MDVO), keystone, and Insulation Displacement Connector (IDC) copper technologies.

7. The telescoping connector assembly of claim 1, wherein the second cable comprises a second cable plug, and said interface comprises a second socket adapted to receive the second cable plug.

8. The telescoping connector assembly of claim 7, wherein the first cable plug comprises a first ferrule and the second cable plug comprises a second ferrule and wherein when the first cable plug is inserted into said first socket and the second cable plug is inserted into said second socket, the first ferrule is aligned with and touching the second ferrule.

9. The telescoping connector assembly of claim 7, wherein said connector conforms to a standardized optical fiber technology selected from the group consisting of Lucent Connector (LC), Straight Tip (ST), Siemon Connector (SC), Ferrule Connector (FC), Mechanical Transfer Registered Jack (MT-RJ) and Multi-Fiber Push On (MPO) type optical fiber technologies.

10. The telescoping connector assembly of claim 1, wherein said at least one connector comprises a pair of opposed and substantially parallel runners extending backwards from said front face, said sliding mechanism comprises a hollow rectangular bezel mounted within said mounting opening, said bezel comprising a pair of substantially flat and opposing inner surfaces and a pair of transverse slots, one of each of said pair of transverse slots in respective ones said pair of inner surfaces, and said pair of runners is spaced to fit between said pair of inner surfaces, each of said pair of runners adapted to slide within a respective one of said pair of transverse slots between said retracted position and said telescoped position.

11. The telescoping connector assembly of claim 10, wherein said bezel comprises a lock for releasably securing said bezel within said mounting opening.

12. The telescoping connector assembly of claim 10, comprising a plurality of said connectors, and wherein said bezel further comprises at least one transverse supporting member positioned substantially right angles to said first and said second inner surface.

13. The telescoping connector assembly of claim 10, wherein said bezel includes on an outer surface thereof a strip for fastening an identification label thereto.

14. The telescoping connector assembly of claim 10, wherein said retaining mechanism comprises a pair of raised lips, one of each of said lips provided at an end of a respective one of each of said pair of runners and further wherein when said connector is moved to said telescoped position said pair of lips engage a rear edge of said bezel.

15. The telescoping connector assembly of claim 14, wherein said pair of runners are manufactured from a flexible and nonconductive material.

16. The telescoping connector assembly of claim 15, wherein said at least one connector is releasably received in said bezel and is extractable there from by applying a bending force to said pair of runners such that said pair of lips clear said rearward edge.

17. The telescoping connector assembly of claim 10, wherein each of said pair of runners comprises a slot formed therein and said bezel further comprises a pair of bosses, one of each of said bosses provided on a respective one of said pair of opposing inner surfaces and wherein in operation, each of said bosses slides within a respective one of said pair of slots.

18. The telescoping connector assembly of claim 17, wherein each of said pair of slots is open ended and extends to a rear end of its respective runner, at least one of said runners further comprising a pair of opposing teeth projecting into said open ended slot towards a rearward end thereof, each of said pairs of teeth engaging a respective one of said bosses when said at least one connector is in a forward position.

19. The telescoping connector assembly of claim 18, wherein each of said slots further comprises a plurality of pairs of opposing teeth arranged along a length thereof for positioning said connector at a plurality of positions.

20. The telescoping connector assembly of claim 10, wherein said bezel further comprises first and second elongate channels, one of each of said first and second elongate channels formed in a respective one of said pair of inner surfaces, a first elongate ridge formed along a length of a first of said pair of runners dimensioned to fit within said first elongate channel and a second elongate ridge formed along a length of a second of said pair of runners dimensioned to fit within said second elongate channel and wherein in operation said first ridge slides within said first elongate channel and said second ridge slides within said second elongate channel.

21. The telescoping connector assembly of claim 20, wherein said first ridge and said first channel are dimensioned different from said second ridge and said second channel thereby preventing mounting of a reversed one of said connector within said mounting opening.

22. The telescoping connector assembly of claim 20, wherein each of said first and said second ridge increase in width along a length thereof for providing a tactile feedback of a position thereof relative to said front face of said frame.

23. A telescoping connector assembly for mounting in a mounting opening in a face of network equipment and terminating a pair of cables, each of the cables comprising a cable plug, the connector assembly comprising:

a pair of connectors within the mounting opening, each of said connectors comprising at a front face thereof a socket adapted to receive the cable plug;

a sliding mechanism positioned between the mounting opening and each of said pair of connectors for enabling independent movement of each of said pair of first connectors between a retracted position and a telescoped position along respective parallel paths arranged at an angle to said front face of said frame; and a retaining mechanism for impeding movement of each of said pair of connectors beyond said telescoped position.

24. The telescoping connector assembly of claim 23, wherein each of said pair of connectors comprises a pair of opposed and substantially parallel runners extending backwards from said front face, said sliding mechanism comprises a hollow rectangular bezel mounted within said mounting opening, said bezel comprising a pair of substantially flat and opposing inner surfaces and, for each of said pair of connectors, a pair of transverse slots, one of each of said pair of transverse slots in respective ones said pair of inner surfaces, and further wherein each of said pair of runners is spaced to fit between said pair of inner surfaces, said pairs of runners adapted to slide within a respective pair of said transverse slots between said retracted position and said telescoped position.

25. A method for removing a cable plug terminating a cable from a socket into which the cable plug has been secured, the cable plug further comprising a latch for releasing the cable plug from the socket, the method comprising:

providing a mounting opening in a face of a network equipment;

providing a sliding mechanism positioned between said mounting opening and the socket, said sliding mechanism enabling movement of the socket along a predetermined path arranged at an angle to said face between a retracted position and a telescoped position;

providing a retaining mechanism impeding movement of the socket beyond said telescoped position;

sliding the socket from said retracted position to said telescoped position; and depressing the latch while simultaneously retracting the cable plug from the socket.

26. The method of claim 25, wherein said angle is a right angle.

27. The method of claim 25, wherein said network equipment is a patch panel.

28. The method of claim 25, further comprising providing a connector wherein the socket is positioned in a front face thereof, said connector further comprising a pair of opposed and substantially parallel running surfaces extending backwards from said front face, said sliding mechanism comprising a hollow rectangular bezel mounted within said mounting opening, said bezel comprising a pair of substantially flat and opposing inner surfaces and a pair of transverse slots, one of each of said pair of transverse slots in respective ones said pair of inner surfaces, wherein said pair of running surfaces is spaced to fit between said pair of inner surfaces, each of said pair of running surfaces adapted to slide within a respective one of said pair of transverse slots between said retracted position and said telescoped position.

* * * * *